United States Patent
Dimmler et al.

(10) Patent No.: US 9,937,650 B2
(45) Date of Patent: Apr. 10, 2018

(54) OPERATING UNIT FOR AN INJECTION MOLDING MACHINE

(71) Applicant: ENGEL AUSTRIA GmbH, Schwertberg (AT)

(72) Inventors: Gerhard Dimmler, Steinhaus (AT); Josef Giessauf, Perg (AT); Rainer Hoelzl, Tragwein (AT); Albin Kern, Schwertberg (AT); Friedrich Mairhofer, Naarn im Machland (AT); Helmut Steinparzer, Steyr (AT); Johann Voggeneder, Mauthausen (AT); Karl Wiesinger, Neuhofen/Krems (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 596 days.

(21) Appl. No.: 14/088,819

(22) Filed: Nov. 25, 2013

(65) Prior Publication Data
US 2014/0156059 A1 Jun. 5, 2014

(30) Foreign Application Priority Data
Nov. 26, 2012 (AT) .................................. 1239/2012

(51) Int. Cl.
*B29C 45/76* (2006.01)
*G05B 19/409* (2006.01)

(52) U.S. Cl.
CPC ............ *B29C 45/76* (2013.01); *G05B 19/409* (2013.01); *B29C 2045/7606* (2013.01)

(58) Field of Classification Search
CPC ....................... B29C 2045/7606; G05B 19/409
See application file for complete search history.

(56) References Cited

U.S. PATENT DOCUMENTS 5,470,218 A * 11/1995 Hillman ................ B29C 45/768
                                                        264/40.6
5,781,190 A * 7/1998 Gorbet ...................... H04L 29/06
                                                        709/200

(Continued)

FOREIGN PATENT DOCUMENTS

AT 511 487 12/2012
CN 102398355 4/2012

(Continued)

OTHER PUBLICATIONS

Selogica, "Selogica Set-up Assistant", Sep. 25, 2012 (accessed from <<https://www.youtube.com/watch?v=ferDKH1345l>> on May 5, 2016).*

(Continued)

*Primary Examiner* — Kenneth M Lo
*Assistant Examiner* — Michael J Huntley
(74) *Attorney, Agent, or Firm* — Wenderoth, Lind & Ponack, L.L.P.

(57) ABSTRACT

An operating unit includes a touch-sensitive display screen for displaying an operating program, a control or regulating unit for communicating operating signals to injection molding machine elements, and the operating program is stored in the control or regulating unit, and at least one operating button, upon the actuation of which the control or regulating unit triggers an action of an injection molding machine element. The operating program has a hierarchical system architecture with at least one upper installation-specific level and an upper task-specific level. A selection can be made between different installation regions in the installation-specific central level, between different task regions in the task-specific central level, and a plurality of sublevels. Process-relevant program pages associated only with the (Continued)

selected installation region or only with the selected task region can be displayed in each selected sublevel.

16 Claims, 5 Drawing Sheets

(56) References Cited

U.S. PATENT DOCUMENTS

| | | | | |
|---|---|---|---|---|
| 5,920,316 | A * | 7/1999 | Oran | G06F 3/0481 715/779 |
| 6,073,059 | A * | 6/2000 | Hayashi | B29C 37/00 700/181 |
| 6,618,041 | B2 * | 9/2003 | Nishizawa | G06F 3/04847 264/40.1 |
| 6,925,354 | B2 * | 8/2005 | Morwald | B29C 45/76 156/125 |
| 6,931,300 | B2 * | 8/2005 | Yamazaki | G05B 19/409 700/200 |
| 7,890,880 | B2 | 2/2011 | Hehl | |
| 7,918,661 | B2 * | 4/2011 | Busse | B29C 49/78 425/162 |
| 2003/0160829 | A1 * | 8/2003 | Miksovsky | G06F 17/3089 715/804 |
| 2004/0088073 | A1 * | 5/2004 | Yamazaki | B29C 45/76 700/200 |
| 2004/0181293 | A1 * | 9/2004 | Tanizawa | B29C 45/76 700/17 |
| 2006/0157880 | A1 * | 7/2006 | Hehl | B29C 45/76 264/40.1 |
| 2006/0247822 | A1 * | 11/2006 | Nishizawa | B29C 45/76 700/200 |
| 2010/0323334 | A1 * | 12/2010 | Goforth | G09B 19/00 434/219 |
| 2011/0145767 | A1 * | 6/2011 | Satou | G06F 3/0482 715/841 |
| 2014/0023984 | A1 * | 1/2014 | Weatherly | A61B 1/00016 433/31 |

FOREIGN PATENT DOCUMENTS

| | | |
|---|---|---|
| DE | 10 2007 050 073 | 4/2009 |
| EP | 1 902 827 | 3/2008 |
| JP | 2001-145947 | 5/2001 |
| JP | 2004-155088 | 6/2004 |
| KR | 1990-0006299 | 8/1990 |
| WO | 86/05741 | 10/1986 |
| WO | 01/67191 | 9/2001 |
| WO | 2005/009719 | 2/2005 |
| WO | 2009/053231 | 4/2009 |

OTHER PUBLICATIONS

Arburg, "Injection Moulding Machines for Diverse Applications", Arburg, Sep. 2012 (Accessed from <<http://www.aoteamachinery.co.nz/wp-content/uploads/ARBURG_hydraulic_ALLROUNDER_en_GB.pdf>> on May 6, 2016).*

Selogica, "Selogica Set-up Assistant", Sep. 25, 2012 (addendum to prior submissions, accessed from <<https://www.youtube.com/watch?v=ferDKH1345l>> on Oct. 19, 2017).*

Chinese Search Report dated Aug. 27, 2015 in corresponding Chinese Application No. 201310757505.8.

Austrian Patent Office Search Report dated Oct. 4, 2013 in Austrian Application No. A 1239/2012, with English translation.

Selogica Control: Comprehensive management for injection molding technology. Product information [online]. Arburg GmbH + CoKG, Apr. 2012, Download from the internet: <URL:http://pdf.directindustry.de/pdf/arburg/selogica/7258-302110.html>, the entire document, in particular screen 4 and 5, downloaded on Apr. 10, 2013.

* cited by examiner

OPERATING UNIT FOR AN INJECTION MOLDING MACHINE

BACKGROUND OF THE INVENTION

Field of the Invention

The invention concerns an operating unit for an injection molding machine, comprising an in particular touch-sensitive display screen for displaying an operating program, a control or regulating unit for communicating operating signals to injection molding machine elements, wherein the operating program is stored in the control or regulating unit, and at least one operating button, upon the actuation of which the control or regulating unit triggers an action of an injection molding machine element. The invention further concerns a method of operating such an operating unit.

Background of Related Art

The complexity involved in the operation of injection molding machines has greatly increased in recent years. That is to be attributed in particular to the fact that more and more different kinds of injection molding machines enjoying different manufacturing options are being produced, but all those different injection molding machines are operated by way of one and the same operating program. As an example mention is to be made for such operation of an injection molding machine of Austrian patent application number A 851/2011 to the present applicant, which is not a prior publication and which involves in particular a simplification in the allocation of trigger symbols to operating keys or buttons.

Because of the high complexity of modernday injection molding machines and the high level of automation, a large number of parameters are distributed on many different image pages or program pages. In that respect it is difficult for the operator to find the desired parameter in that multiplicity of image pages and parameters and to navigate quickly between the image pages (program pages). According to the tool implementation it very frequently happens that it is not the entire functional extent of the machine that is required, but that is available in its entirety to the operator by way of the entire operating program and its sub-menus.

SUMMARY OF THE INVENTION

The object of the present invention is therefore that of providing an operating unit and a method, in which the disadvantages known from the state of the art are eliminated. In particular the invention seeks to reduce operating complexity and to permit clearly implemented operation of the injection molding machine.

For an operating unit having the features of the classifying portion of claim 1 that is attained in that the operating program has a hierarchical system architecture with at least one upper installation-specific level, wherein a selection can be made between different installation regions in the installation-specific central level, and an upper task-specific level, wherein a selection can be made between different task regions in the task-specific central level, and a plurality of sublevels, wherein process-relevant program pages associated only with the selected installation region or only with the selected task region can be displayed in each selected sublevel. This novel navigation or operating concept is thus reduced to a few levels and is generally limited to two levels (upper level and sublevel).

Preferably when starting the operating program one of the two upper levels is automatically pre-selected, in which respect however both upper levels are of equal rank in the hierarchical system architecture. A button for the respective non-selected upper level is however also displayed, wherein the different installation regions or the different task regions are suitably displayed by actuation of that button.

Alternatively however it is also possible to provide in the hierarchical system architecture a main level in which a selection can be made between an installation-specific menu and a task-specific menu. For that purpose, for better clarity and transparency, it can be provided that the main level and at least one of the upper levels can be represented at the same time. In that second variant two start points for the system are displayed in the main level, those start points being presented on the start screen. Those two are the installation-specific menu (installation region orientation) and the task-specific menu (task orientation). If the installation-specific menu were selected a representation of the entire production cycle is implemented, by way of which image pages and program pages respectively can be displayed, which are associated with the selected region. Examples of installation regions are closing region, injection region, deposit region, mold removal region, periphery region, and so forth. With a selected task-specific menu the arrangement provides a display of all tasks which a user could perform with the installation in an undertaking. Examples in this respect are maintenance of the machine and robots, conversion operations, preparing for production, starting/stopping production, checking production, looking for causes of faults, optimizing production, initial sampling, setting monitoring, system settings, production settings, customer-specific tasks and so forth. In addition various configuration options can be selected with a selected task-specific menu. The task-oriented menu also forms the start point for an assistant.

In particular for a clear transparent beginning of an operating procedure it is preferably provided that the system or the operating program is started with a simple representation of the production cycle of the overall installation, by way of which important program pages can be very quickly reached. The use of special display screen components, in particular in the upper level (selection carousel or speed-dial button grid) in the center of the display region of the display screen, means the operator is quickly and intuitively guided through the different image pages or program pages respectively. Intelligent preselection of the program pages offered is effected by way of the selection carousel and the task and installation selection respectively.

For particularly good clarity and transparency the current navigation path is displayed in the title bar. By means of a suitable switching surface (hierarchy key or button, back button, upwards button) it is possible to change to a level thereabove. It is preferably accordingly provided that hierarchy buttons can be displayed in each level, wherein a higher level can be displayed by actuation of the hierarchy button.

It is further preferably provided that new program pages or program pages of other installation regions or other task regions can be allocated to an installation region or a task region. Accordingly each operator has the option of adding image pages or program pages to an installation region or a task or also removing same if that seems to him necessary or helpful. A change in the sequence for adaptation to the working succession is also possible for the operator.

To achieve an additional reduction in complexity it is preferably provided that a distinction is made between configuration parameters and production parameters. Configuration is selected once when using a new tool and thereby markedly reduces the parameters necessary for operation.

A further possible way of reducing operating complexity is that of limiting for the user the image pages and access rights which can be represented on the basis of his user role. For that purpose, upon allocation of the access authorization, a user role is inter alia also attributed to each user. Possible user roles are fitter, allrounder, process engineer, quality manager, maintenance, auxiliary personnel, ENGEL technician and so forth, thus in the task overview (task-specific level), only those tasks which the operator can or has to perform in accordance with his user role are now presented. For example the maintenance man will discover the tasks "system", "maintenance" and "all image pages" or will encounter those tasks which are not allocated to his user role displayed as inactive image pages (grayed out). The content of the task "all image pages" is in turn specifically restricted to the user role. A simple authorization concept thus assigns to each user authorizations or user roles which he may actually use. In that respect the kind of authorization may also be specified, for example "read", "modify", "erase" or "use". Limitation to ranges within which values may be modified is also possible. Thus for example the user role "auxiliary personnel" may modify any value "x" only by a maximum of 2%, but the "process engineer" may modify it by 100%.

By using those concepts, in a large number of use situations both the number of program pages presented to an operator and also the parameters thereon are reduced by up to 90%.

Protection is also claimed for a method which possibly has the steps of displaying a main level of the operating program with an installation-specific menu and a task-specific menu, optionally making a selection between the installation-specific menu and the task-specific menu, displaying an upper installation-specific level or an upper task-specific level in dependence on the previously selected menu or in dependence on an automatically preselected selection, selecting an installation region from different displayed installation regions or a task region from different displayed task regions, displaying a sublevel in dependence on the selected installation region or the selected task region, wherein process-relevant program pages associated only with the selected installation region or only with the selected task region are displayed in each selected sublevel.

After selection of the sublevel any next steps can be selected. Most frequently the steps are selecting a trigger symbol displayed on the program page, whereby a corresponding action of an injection molding machine element is triggered, or selecting or altering a machine-specific parameter displayed on the program page or navigating by way of navigation buttons to the next or a preceding program page of the selected installation region or the selected task region or navigating by way of hierarchy buttons to another level of the operating program or selecting a metalevel of the operating program.

Protection is further claimed for an injection molding machine having a plurality of activatable injection molding machine elements and an operating unit according to the invention.

BRIEF DESCRIPTION OF THE DRAWINGS

Further details and advantages of the present invention are described in greater detail hereinafter by means of the specific description with reference to the embodiments by way of example illustrated in the drawings in which:

FIG. 1a shows an operating unit of the injection molding machine,

DETAILED DESCRIPTION

Figure 1:
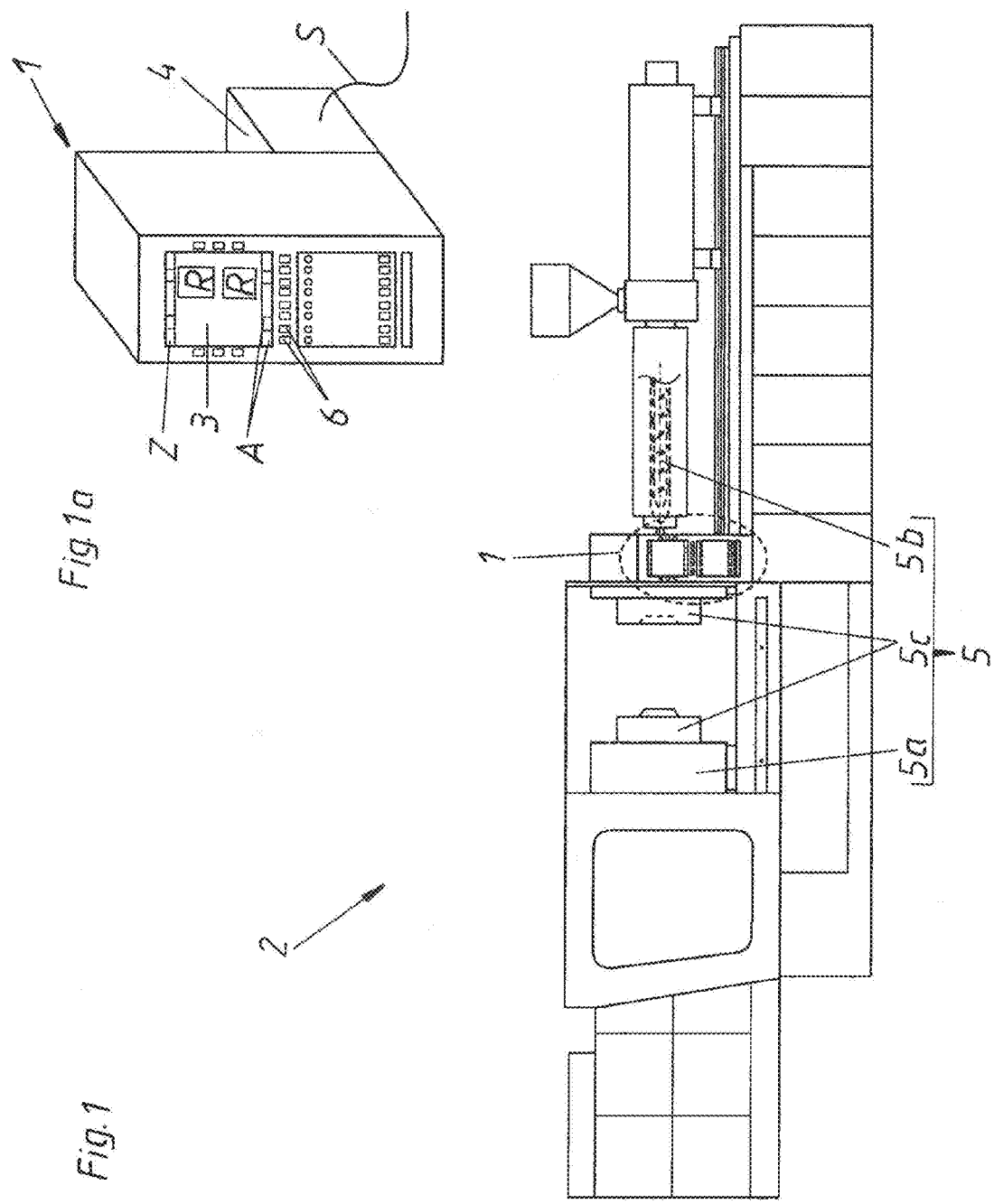
FIG. 1 shows an injection molding machine.

FIG. 1 diagrammatically shows an injection molding machine 2 and FIG. 1a shows an operating unit 3. Some moveable or actuable injection molding machine elements 5 are diagrammatically shown in FIG. 1. By way of example the Figure shows the moveable mold mounting plate 5a, the heatable and coolable mold tools 5c and the injection screw 5b which is rotatable or moveable with a translatory movement. An action on the part of those injection molding machine elements 5 can be triggered by actuation of the operating key or button 6. The operating button 6 can be in the form of a separate mechanical key or part of the touch surface of the display screen 3. Depending on the respectively associated trigger symbol A, upon actuation of the operating button 6, an operating signal S is communicated by way of the control or regulating unit 4 and the operating program B to the corresponding injection molding machine element 5 and the corresponding action is performed. Besides the selection symbols A, the metalevel Z and various machine-specific parameters R are represented on the display screen 3 of the operating unit 1. Allocation of the trigger symbols A to the operating button 6 is effected in per se known manner.

Figure 2:
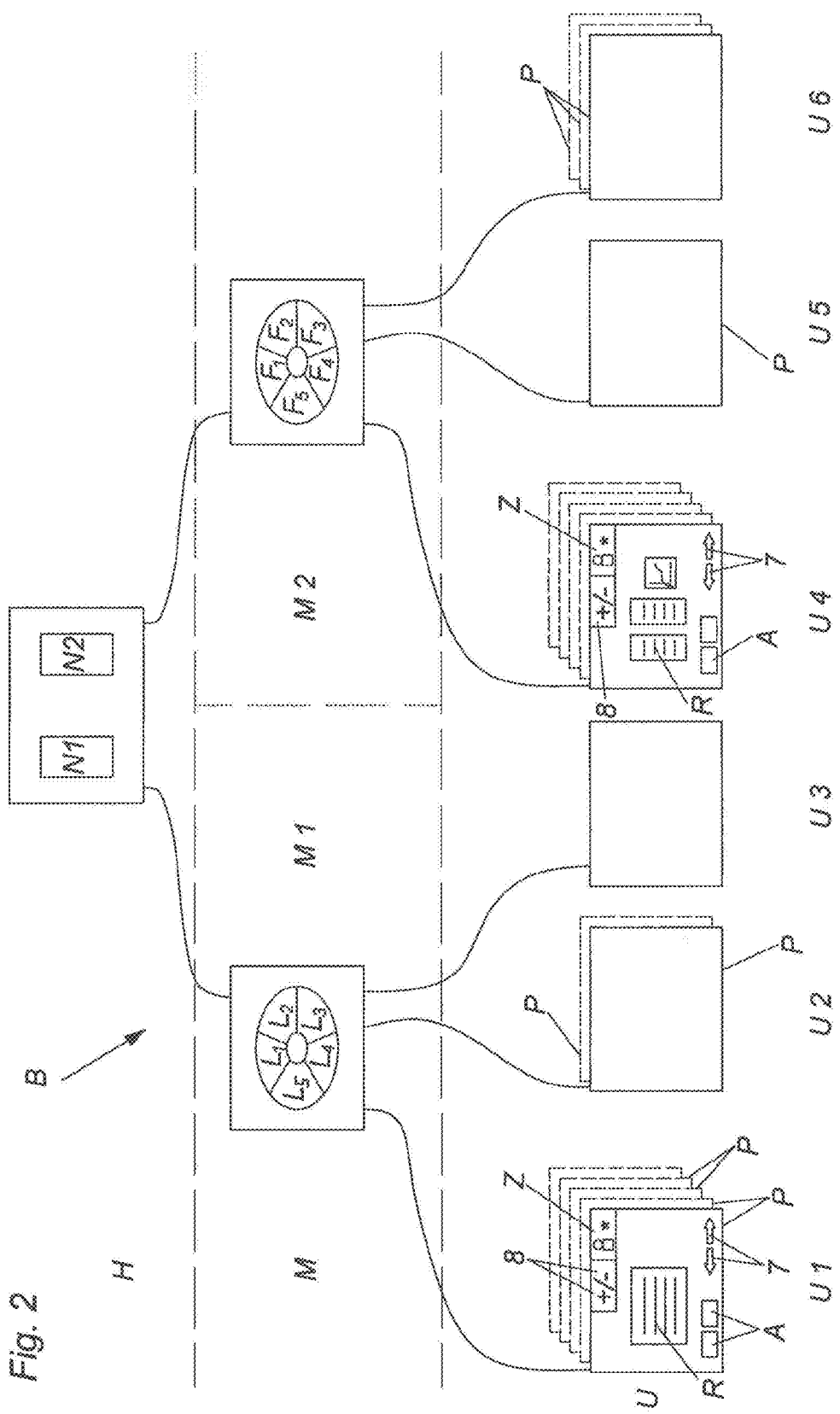
FIG. 2 diagrammatically shows the hierarchical system architecture of the operating program.

FIG. 2 diagrammatically shows the operating program B stored in the control or regulating unit 4 and having the three levels (main level H, upper level M and sublevel U). The main level H forms the start page of the operating program B and thus forms the tip of the hierarchical system architecture. In that main level H a selection can be made between the installation-specific menu N1 and the task-specific menu N2.

If the installation-specific menu N1 is selected then the operating program B changes and the display on the display screen 3 correspondingly changes into the upper installation-specific level M1. As the overall injection molding machine 2 is subdivided into different installation regions L1 through L5 (for example closing region, injection region, deposit region and so forth), those installation regions L1 through L5 are correspondingly symbolically displayed in the central level M1. Advantageously those different installation regions L1 through L5 are represented by way of a selection arranged in circle form or carousel-like (see also FIG. 3) of the installation regions L1 through L5 present, whereby it is possible to change quickly between the individual installation regions L1 through L5.

As soon as the operator has made his selection from one of those installation regions L1 through L5 the system is changed into the sublevel U. Therein the operator is now only presented with those program pages P which are associated with the selected installation region L. Thus the operator can now only work with the program pages P which are actually important and necessary to him and does not have to "dig" through other program pages P which are not necessary to him. Simple guidance, preferably by way of navigation keys or buttons 7, is effected between the program pages P associated with an installation region L. Accordingly it is preferably provided that the process-relevant program pages P of a selected installation region L or of a selected task region F can only be displayed in succession in a given sequence, wherein particularly preferably navigation keys or buttons 7 can be displayed in the sublevel U, wherein by actuation of the navigation buttons 7 the program pages P can be displayed in accordance with the given sequence in succession or in the reversed sequence. A change between the program pages P of a selected installation region L can also be implemented by way of gestures (for example by "swiping" over the touch-sensitive display screen 3). It is thus possible within an installation region L to easily change from a program page P to the next one and back again. The operator sees the program page P on which he is actually at and which program page P is opened before and after that. The individual program pages P are shown in FIG. 2 by way of the layers shown in broken line and disposed one behind the other (see for example sublevel U1).

In principle at least one parameter R or a trigger symbol A should be displayed on each program page P. It is accordingly preferably provided that at least one trigger symbol A can be displayed on each process-relevant program page P, wherein actuation of an operating button 6 associated with the trigger symbol A can trigger a corresponding action on the part of an injection molding machine element 5. It can additionally or alternatively be provided that machine-specific parameters R can be displayed on the process-relevant program pages P.

In a further preferred embodiment it can be provided that the hierarchical system architecture has a metalevel Z which can be selected independently of the displayed level H, M or U. Thus general functions like print, online help, recipe data management and so forth can be made centrally available whereby they are always accessible and can be selected by the operator independently of the active program page P.

If as shown in FIG. 2 it is not the installation-specific menu N1 but the task-specific menu N2 that is selected, then structured and clearly defined task regions F1 through F5 are available to an operator (for example maintenance personnel). Such a task F could be for example maintenance of the machine or a robot, in which case only a few program pages P are already respectively stored in the correct sequence and can be quickly selected. In contrast to the new invention, in consideration of the countless control generations and the most widely varying machine manufacturers it was hitherto not easy to find the necessary program pages P and parameters R. In the new navigate concept the operator selects that task F1 through F5 (in this case maintenance) which he has to attend to. Now only those program pages P which are relevant to his selected task region F are presented to the operator in the sublevel U (for example U4). Within the task region F simple guidance is effected by the program pages P associated with the task region F. The change from a program page P to the next one or the previous one is effected by the choice of buttons (navigation keys or buttons 7) or by simple gestures or the like. The arrangement of the program pages P is effected in accordance with the logical working procedure. In addition the operator has the option of associating further program pages P with a task or a task region F and adapting the arrangement of the program pages P to his working procedures.

For setting the navigation it is additionally advantageous if hierarchy buttons 8 can be displayed at least in the levels M and U, wherein a higher level H or M can be displayed by actuation of the hierarchy button 8.

Figure 3:
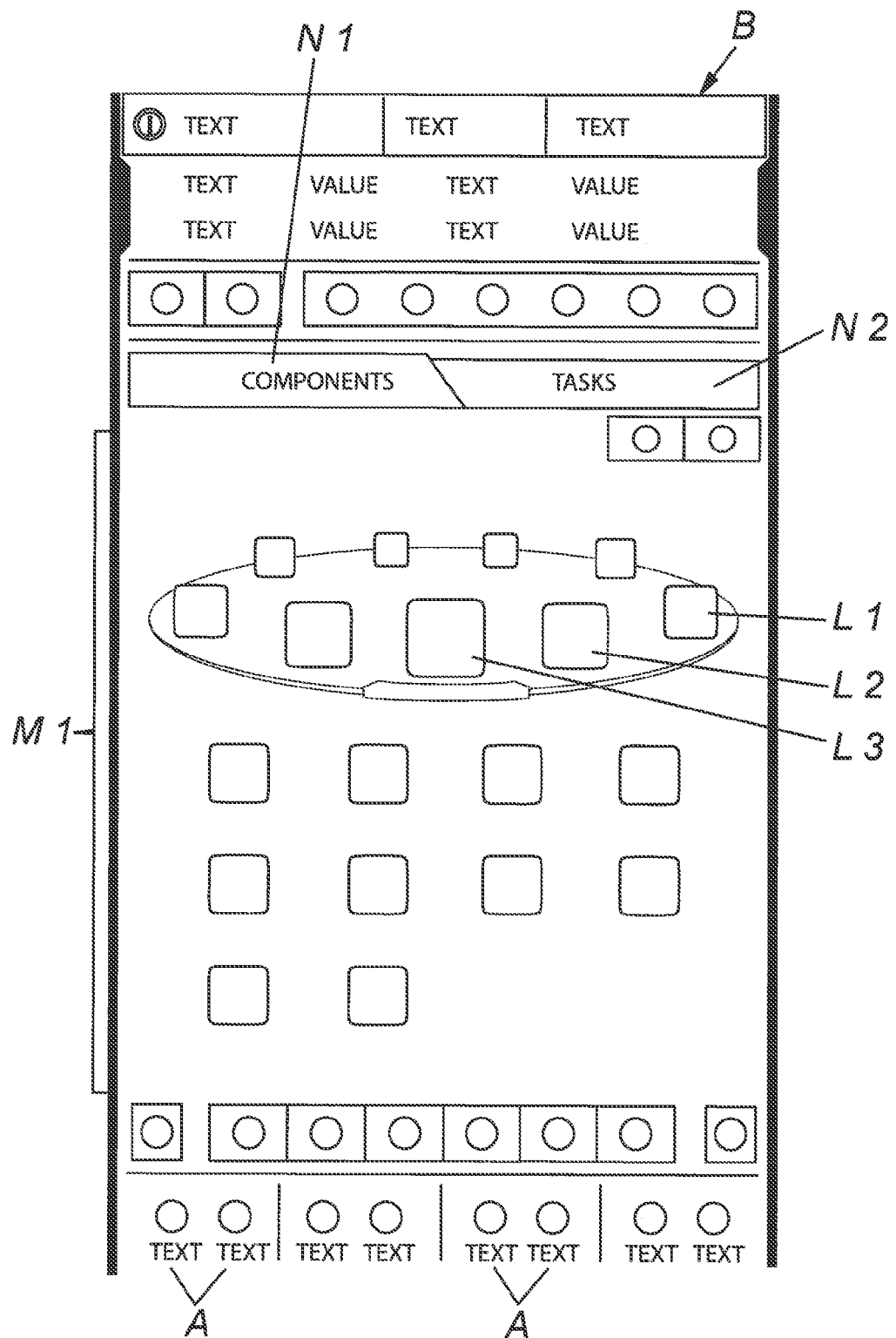
FIG. 3 shows a screenshot with a selected installation-specific level.

FIG. 3 shows a possible start page of the operating program B, as is presented to an operator at the beginning on a display screen 3. In this variant the upper installation-specific level M1 is automatically preselected and all installation regions L are displayed in a kind of carousel. By "swiping" over the carousel displayed on the display screen 3 it is rotated, wherein, for the installation region L which is shown largest or for the installation region L which is shown at the front in the center, the sub-menus U to be matched thereto are displayed as icons in the subjacent display screen region. If no work is to be performed on a given installation region L it is also possible to change to the upper task-specific level M2 by actuation of the button for the task-specific menu N2.

Figure 4:
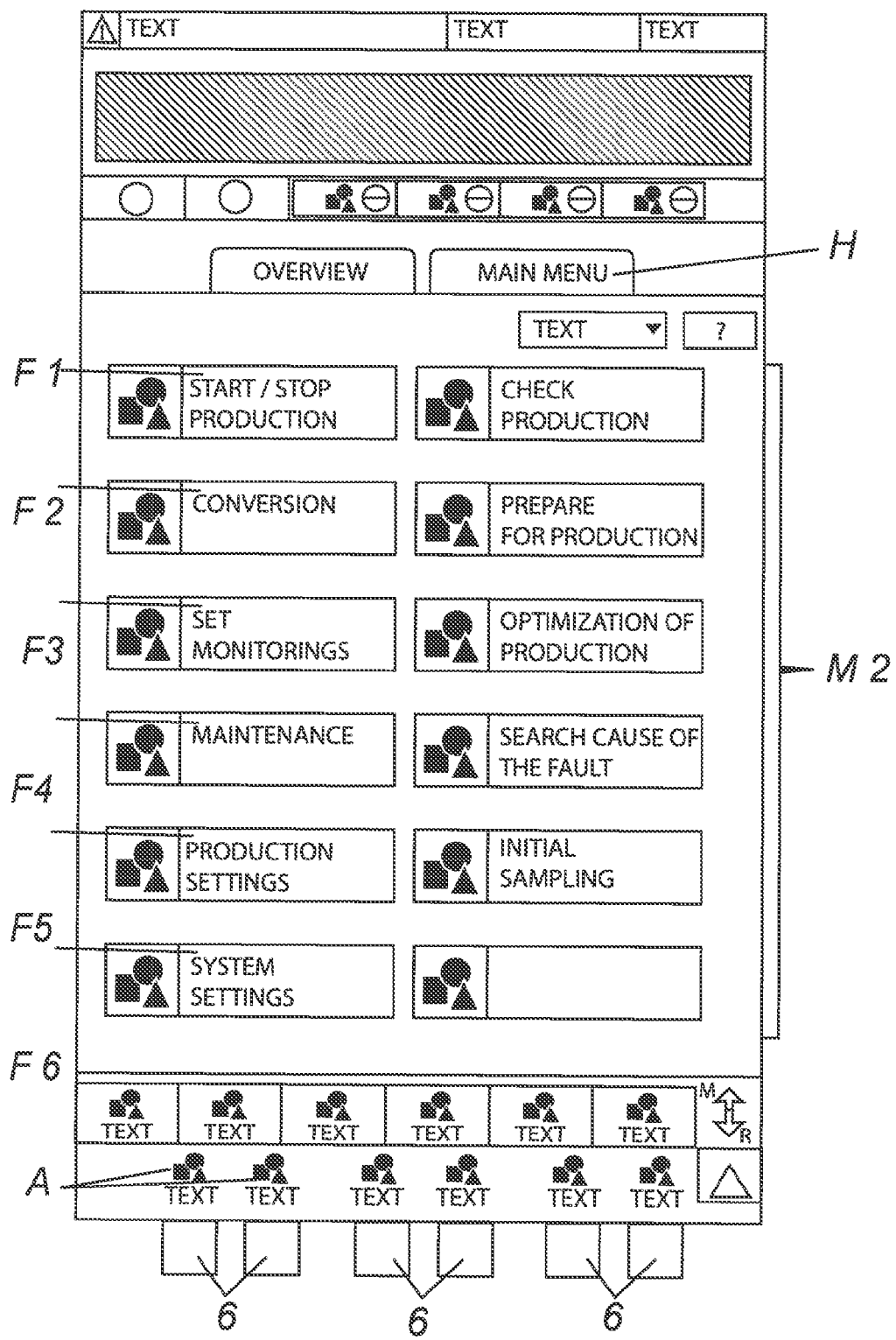
FIG. 4 shows a screenshot with a selected task-specific level.

An example of a possible representation of the upper task-specific level M2 is shown in FIG. 4. In that level M2 an operator can make a selection between the various task regions F which in this case are arranged in table form. These task regions F can naturally also be arranged carousel-like. It is also possible to see in the lower region in FIG. 4 the operating buttons 6 which are arranged on the display screen 3.

Figure 5:
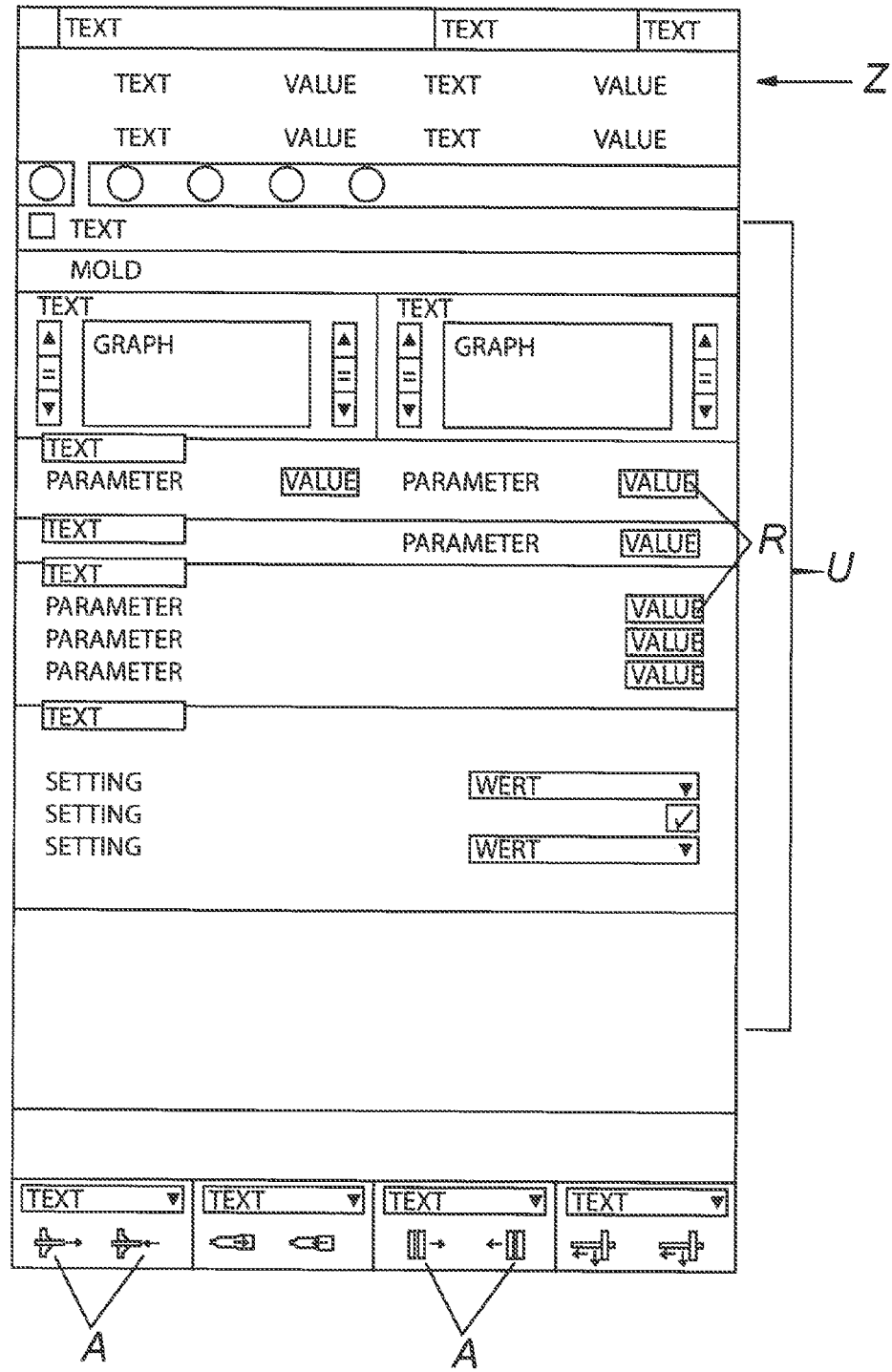
FIG. 5 shows a screenshot of a sublevel.

FIG. 5 shows by way of example a program page P (closing/opening mold), as is displayed in the sublevel U of the hierarchical system architecture on the display screen 3 of the operating unit 1 of the injection molding machine 2. Various parameters R can be modified on that program page P. The most important thing however is that an action on the part of an injection molding machine element 5 is triggered by actuation of the operating buttons 6 (not shown) in accordance with the trigger symbols A displayed thereabove. The metalevel Z can also be seen in the upper region.

The present invention thus provides an operating unit 1 for an injection molding machine 2, that is substantially improved over the state of the art, wherein the simple configuration of the levels (optionally main level H, upper level M and sublevel U) and the logical association of the individual program pages P with the individual task regions F and installation regions L respectively provides an operating interface which is immediately understandable for the operator and easy to operate.

The invention claimed is:

1. An operating control unit (1) for an injection molding machine (2), comprising:
    a touch-sensitive display screen (3) for displaying an operating program (B),
    a control or regulating unit (4) for communicating operating signals (S) to injection molding machine elements (5), wherein an operating program (B) is stored in the control or regulating unit (4), and
    at least one operating button (6), upon an actuation of which the control or regulating unit (4) triggers a corresponding action of one of the injection molding machine elements (5),
    wherein the operating program (B) has a hierarchical system architecture comprising:
    at least one upper installation-specific level (M1), wherein a selection is provided between a plurality of different installation regions (L1-L5) in the at least one upper installation-specific level (M1),
    an upper task-specific level (M2), wherein a selection is provided between a plurality of different task regions (F1-F5) in the upper task-specific level (M2), and
    a plurality of sublevels (U1-U6), wherein process-relevant program pages (P) associated only with a selected one of the plurality of different installation regions (L1-L5) or only with a selected one of the plurality of different task regions (F1-F5) are displayed in a respective one of the plurality of sublevels (U1-U6), wherein at least one trigger symbol (A) is displayed on each of the process-relevant program pages (P), wherein the corresponding action of the one of the injection molding machine elements (5) is triggered by the actuation of the at least one operating button (6) associated with the at least one trigger symbol (A), wherein, depending on the at least one trigger symbol (A), upon the actuation of the at least one operating button (6), one of the operating signals (S) is communicated by way of the control or regulating unit (4) and the operating program (B) to the one of the injection molding machine elements (5) and the corresponding action is performed, wherein the injection molding machine elements (5) include a movable mold mounting plate (5a), an injection screw (5b), and heatable and coolable molding tools (5c), and wherein a representation of an entire production cycle of the injection molding machine (2) is effected/displayed when the at least one upper installation-specific level (M1) is selected.

2. The operating control unit as set forth in claim 1, further comprising a main level (H1) in which a selection is provided between an installation-specific menu (N1) and a task-specific menu (N2).

3. The operating control unit as set forth in claim 2, wherein the main level (H1) and at least one of the installation-specific menu (N1) and the task-specific menu (N2) are simultaneously represented.

4. The operating control unit as set forth in claim 1, wherein the at least one upper installation-specific level (M1) and the upper task-specific level (M2) are of equal rank in the hierarchical system architecture.

5. The operating control unit as set forth in claim 1, wherein machine-specific parameters (R) are displayed on the process-relevant program pages (P).

6. The operating control unit as set forth in claim 1, wherein the process-relevant program pages (P) of the selected one of the plurality of different installation regions (L1-L5) or the selected one of the plurality of different task regions (F1-F5) are displayed in succession only in a given sequence.

7. The operating control unit as set forth in claim 6, further comprising navigation buttons (7) displayed in at least one of the plurality of sublevels (U1-U6), wherein by actuation of the navigation buttons (7) the process-relevant program pages (P) are sequentially displayed or in a reverse of the given sequence.

8. The operating control unit as set forth in claim 1, further comprising a hierarchy button (8) displayed at least in an upper level (M) and in at least one of the plurality of sublevels (U1-U6), wherein a higher hierarchal level (H, M) is displayed by actuation of the hierarchy button (8).

9. The operating control unit as set forth in claim 1, wherein the process-relevant program pages (P) of the plurality of different installation regions (L1-L5) are different from the process-relevant program pages (P) of the plurality of different task regions (F1-F5).

10. The operating control unit as set forth in claim 1, wherein the hierarchical system architecture further comprises a metalevel (Z) which is selectable independently of a displayed level (H, M, U).

11. A method of operating an injection molding machine (2), comprising:

displaying on a touch-sensitive display screen (3) an operating program (B) having a hierarchical system architecture, communicating operating signals (S) by a control or regulating unit (4) to injection molding machine elements (5), the operating program (B) being stored in the control or regulating unit (4), actuating at least one operating button (6), to trigger a corresponding action of one of the injection molding machine elements (5) by the control or regulating unit (4), displaying an entire production cycle of the injection molding machine (2) in an upper installation-specific level (M1) or an upper task-specific level (M2) in dependence on a previously selected menu (N1, N2) or a preset selection, selecting an installation region (L) from various displayed installation regions (L1-L5) or a task region (F) from different displayed task regions (F1-F5), and displaying a sublevel (U1-U6) in dependence on the selected one of the various displayed installation regions (L1-L5) or the selected one of the different displayed task regions (F1-F5), wherein process-relevant program pages (P) associated only with the selected one of the various displayed installation regions (L1-L5) or only with the selected one of the different displayed task regions (F1-F5) are displayed in each selected sublevel (U1-U6), wherein at least one trigger symbol (A) is displayed on each of the process-relevant program pages (P), wherein the corresponding action of the one of the injection molding machine elements (5) is triggered by actuation of the at least one operating button (6) associated with the at least one trigger symbol (A), wherein, depending on the at least one trigger symbol (A), upon the actuation of the at least one operating button (6), one of the operating signals (S) is communicated by way of the control or regulating unit (4) and the operating program (B) to the one of the injection molding machine elements (5) and the corresponding action is performed, and wherein the injection molding machine elements (5) include a movable mold mounting plate (5a), an injection screw (5b), and heatable and coolable molding tools (5c).

12. The method as set forth in claim 11, further comprising at least one of:

selecting or altering a machine-specific parameter (R) displayed on at least one of the process-relevant program pages (P), navigating by way of a plurality of navigation buttons (7) to a next or a preceding one of the process-relevant program pages (P) of the selected one of the various displayed installation regions (L1-L5) or the selected one of the different displayed task regions (F1-F5), navigating by way of a plurality of hierarchy buttons (8) to another hierarchal level (H, M, U) of the operating program (B), and selecting a metalevel (Z) of the operating program (B).

13. An operating control unit (1) for an injection molding machine (2), comprising:

a touch-sensitive display screen (3) for displaying an operating program (B), a control or regulating unit (4) for communicating operating signals (S) to injection molding machine elements (5), wherein an operating program (B) is stored in the control or regulating unit (4), and at least one operating button upon (6), an actuation of which the control or regulating unit (4) triggers a corresponding action of one of the injection molding machine elements (5), wherein the operating program (B) has a hierarchical system architecture comprising:

at least one upper installation-specific level (M1), wherein a selection is provided between a plurality of different installation regions (L1-L5) in the at least one upper installation-specific level (M1), an upper task-specific level (M2), wherein a selection is provided between a plurality of different task regions (F1-F5) in the upper task-specific level (M2), and a plurality of sublevels (U1-U6), wherein process-relevant program pages (P) associated only with a selected one of the plurality of different installation regions (L1-L5) or only with a selected one of the plurality of different task regions (F1-F5) are displayed in a respective one of the plurality of sublevels (U1-U6), wherein the plurality of different installation regions (L1-L5) in the at least one upper installation-specific level (M1) includes at least one of the group consisting of a closing region, an injection region, a deposit region, a mold removal region, and a periphery region of the injection molding machine (2), wherein at least one trigger symbol (A) is displayed on each of the process-relevant program pages (P), wherein the corresponding action of the one of the injection molding machine elements (5) is triggered by the actuation of the at least one operating button (6) associated with the at least one trigger symbol (A), wherein, depending on the at least one trigger symbol (A), upon the actuation of the at least one operating button (6), one of the operating signals (S) is communicated by way of the control or regulating unit (4) and the operating program (B) to the one of the injection molding machine elements (5) and the corresponding action is performed, and wherein the injection molding machine elements (5) include a movable mold mounting plate (5a), an injection screw (5b), and heatable and coolable molding tools (5c).

14. An operating control unit (1) for an injection molding machine (2), comprising:

a touch-sensitive display screen (3) for displaying an operating program (B), a control or regulating unit (4) for communicating operating signals (S) to injection molding machine elements (5), wherein an operating program (B) is stored in the control or regulating unit (4), and at least one operating button (6), upon an actuation of which the control or regulating unit (4) triggers a corresponding action of one of the injection molding machine elements (5), wherein the operating program (B) has a hierarchical system architecture comprising:

at least one upper installation-specific level (M1), wherein a selection is provided between a plurality of different installation regions (L1-L5) in the at least one upper installation-specific level (M1), an upper task-specific level (M2), wherein a selection is provided between a plurality of different task regions (F1-F5) in the upper task-specific level (M2), and a plurality of sublevels (U1-U6), wherein process-relevant program pages (P) associated only with a selected one of the plurality of different installation regions (L1-L5) or only with a selected one of the plurality of different task regions (F1-F5) are displayed in a respective one of the plurality of sublevels (U1-U6), wherein the plurality of different installation regions (L1-L5) in the at least one upper installation-specific level (M1) and/or the plurality of different task regions (F1-F5) in the upper task-specific level (M2) are displayably moveable by swiping over the touch-sensitive display screen, wherein at least one trigger symbol (A) is displayed on each of the process-relevant program pages (P), wherein the corresponding action of the one of the injection molding machine elements (5) is triggered by the actuation of the at least one operating button (6) associated with the at least one trigger symbol (A), wherein, depending on the at least one trigger symbol (A), upon the actuation of the at least one operating button (6), one of the operating signals (S) is communicated by way of the control or regulating unit (4) and the operating program (B) to the one of the injection molding machine elements (5) and the corresponding action is performed, and wherein the injection molding machine elements (5) include a movable mold mounting plate (5a), an injection screw (5b), and heatable and coolable molding tools (5c).

15. The operating control unit for an injection molding machine (2) according to claim 14, wherein:

the plurality of different task regions (F1-F5) in the operation specific at least one upper installation-specific level (M1) and/or the plurality of different task regions (F1-F5) in the upper task-specific level (M2) are displayed as a moveable carousel; and by the swiping over the touch-sensitive display screen the moveable carousel is rotated.

16. An operating control unit (1) for an injection molding machine (2), comprising:

a touch-sensitive display screen (3) for displaying an operating program (B), a control or regulating unit (4) for communicating operating signals (S) to injection molding machine elements (5), wherein an operating program (B) is stored in the control or regulating unit (4), and at least one operating button (6), upon an actuation of which the control or regulating unit (4) triggers a corresponding action of one of the injection molding machine elements (5), wherein the operating program (B) has a hierarchical system architecture comprising:

at least one upper installation-specific level (M1), wherein a selection is provided between a plurality of different installation regions (L1-L5) in the at least one upper installation-specific level (M1), an upper task-specific level (M2), wherein a selection is provided between a plurality of different task regions (F1-F5) in the upper task-specific level (M2), and a plurality of sublevels (U1-U6), wherein process-relevant program pages (P) associated only with a selected one of the plurality of different installation regions (L1-L5) or only with a selected one of the plurality of different task regions (F1-F5) are displayed in a respective one of the plurality of sublevels (U1-U6), wherein at least one trigger symbol (A) is displayed on each of the process-relevant program pages (P), wherein the corresponding action of the one of the injection molding machine elements (5) is triggered by the actuation of the at least one operating button (6) associated with the at least one trigger symbol (A), wherein, depending on the at least one trigger symbol (A), upon the actuation of the at least one operating button (6), one of the operating signals (S) is communicated by way of the control or regulating unit (4) and the operating program (B) to the one of the injection molding machine elements (5) and the corresponding action is performed, wherein, after one of the process-relevant program pages (P) is selected, other corresponding actions of the injection molding machine elements (5) are filtered or locked out from being triggered, wherein the injection molding machine elements (5) include a movable mold mounting plate (5a), an injection screw (5b), and heatable and coolable molding tools (5c), and wherein a representation of an entire production cycle of the injection molding machine (2) is effected/displayed when the at least one upper installation-specific level is selected.

* * * * *